Feb. 6, 1951     V. D. BEHN     2,540,858
HELICAL-SHIFT MULTISPEED TRANSMISSION
Filed Nov. 9, 1945     2 Sheets-Sheet 1
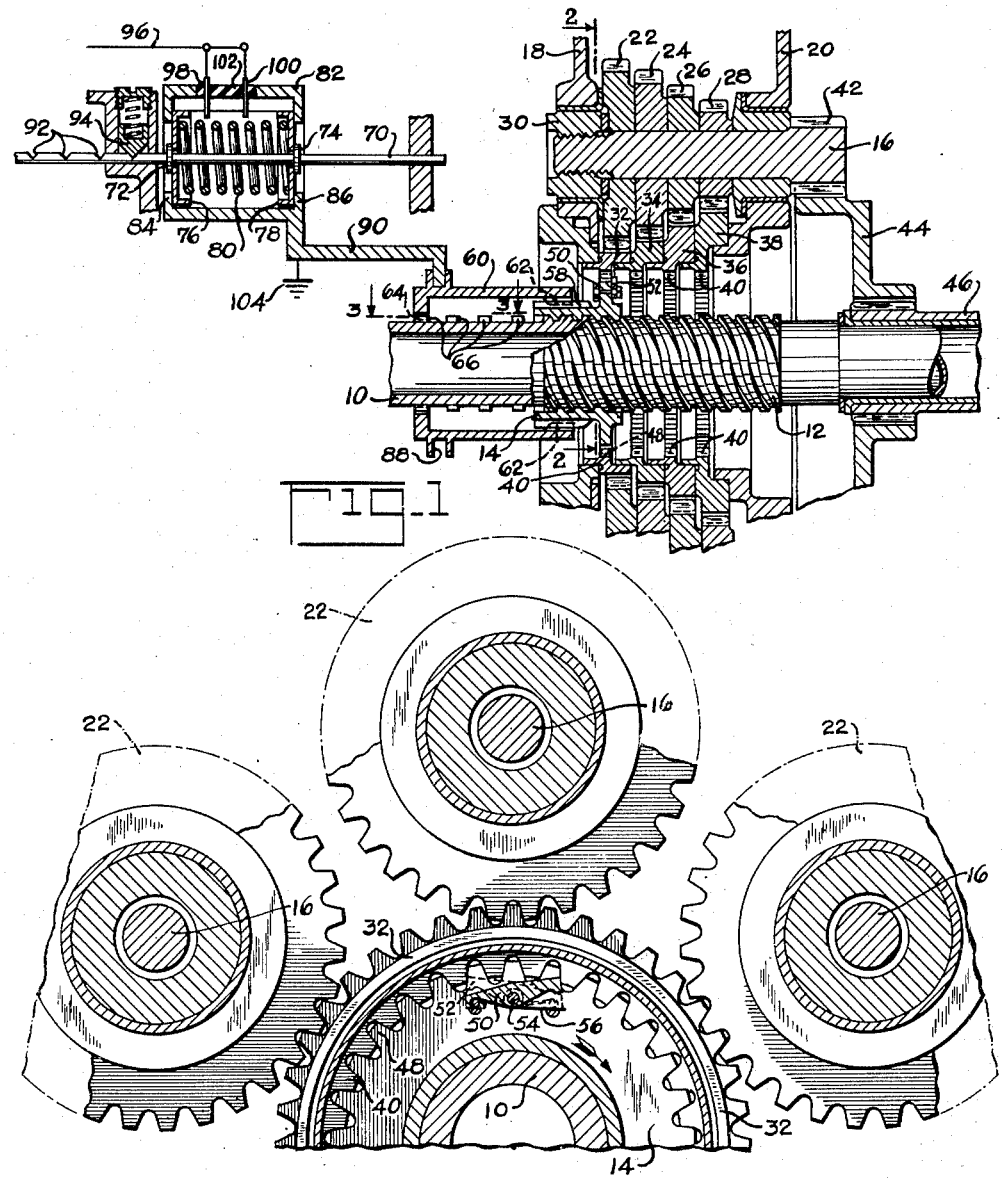
INVENTOR.
VICTOR D. BEHN.
ATTORNEY Feb. 6, 1951 V. D. BEHN 2,540,858
HELICAL-SHIFT MULTISPEED TRANSMISSION
Filed Nov. 9, 1945 2 Sheets—Sheet 2
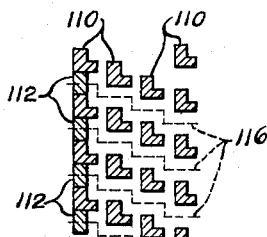
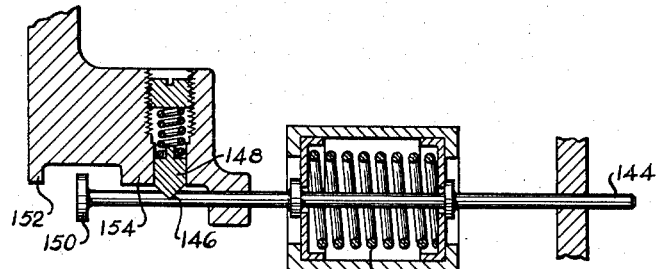
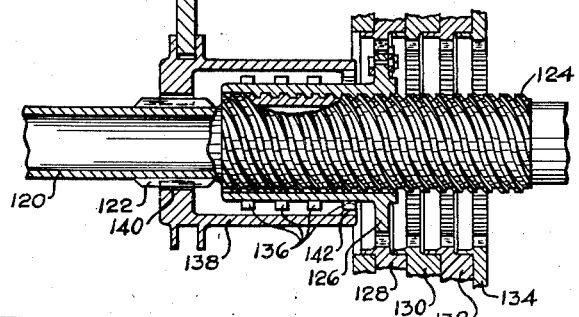
INVENTOR.
VICTOR D. BEHN.
BY
ATTORNEY Patented Feb. 6, 1951

2,540,858

UNITED STATES PATENT OFFICE 2,540,858

HELICAL-SHIFT MULTISPEED TRANSMISSION

Victor D. Behn, Glen Rock, N. J., assignor to Wright Aeronautical Corporation, a corporation of New York Application November 9, 1945, Serial No. 627,578

13 Claims. (Cl. 74—371)

This invention relates to multi-speed transmissions and is particularly directed to transmissions of a type illustrated in an application, Serial No. 492,166, filed by R. Chilton, issued as Patent No. 2,400,539 on May 21, 1946. In said Chilton patent, a speed ratio shift member is shiftable along helical splines on a drive shaft for selective engagement with any one of a plurality of gears. In addition, in said Chilton patent, locking means comprising a pair of locking members are provided to releasably lock the shift member against movement in both directions while said shift member is engaged with any one of said gears. It is an object of this invention to provide a relatively simple locking means for such a shift member. Specifically, the invention comprises a single locking member which is adapted to lock the shift member against movement in both directions while the shift member is engaged with a gear.

Other objects of this invention will become apparent upon reading the annexed detailed description in connection with the drawing in which:

Figure 1 is a schematic axial sectional view through a transmission embodying the invention;

Figure 2 is an enlarged sectional view taken along line 2—2 of Figure 1;

Figure 3 is a developed section taken along line 3—3 of Figure 1;

Figure 4 is a developed section illustrating a modification of Figure 3; and

Figure 5 is an axial sectional view similar to Figure 1 but of a further modification.

The invention is described in connection with a transmission for an engine driven automotive vehicle, but, as will appear, the invention is not limited to this specific application. Also, as used in the specification and claims, unless otherwise specified, the term "speed ratio" always refers to the ratio of the speed of the transmission output shaft to the speed of the transmission input shaft.

Referring to the drawing, an engine drive transmitting member or transmission input shaft 10 is provided with helical splines 12 upon which a speed ratio shift member 14 is mounted for shift movement along the helical splines. A plurality of circumferentially spaced layshafts 16 are spaced around the shaft 10 and are journaled in fixed bearing diaphragms 18 and 20 secured to the transmission housing. Each layshaft 16 is provided with a plurality of gears 22, 24, 26 and 28 tightly secured to the layshafts by a nut 30. As illustrated, the gears 22, 24, 26 and 28 are of different pitch diameters and are respectively engaged with nested clutch gears 32, 34, 36 and 38 having similar internal clutch teeth 40. The layshafts 16 are each also provided with a pinion gear 42 disposed in meshing engagement with a gear 44 splined to a drive transmitting or output shaft 46. The speed ratio shift member 14 is provided with clutch teeth 48 adapted to selectively engage the clutch teeth 40 of the clutch gears 32, 34, 36 and 38. With this construction, the speed ratio of the drive connection between the input shaft 10 and the output shaft 46 depends on which of the clutch gears is engaged by the shift member. Any number of speed ratios may be provided merely by providing the appropriate number of clutch gears for engagement by the shift member.

As illustrated, the pinion gears 22, 24, 26 and 28 are of progressively decreasing pitch diameter. Accordingly, the gears 22 provide the first or low speed ratio between the input and output shafts and the gears 24, 26 and 28 provide progressively higher speed ratios—namely, second, third and fourth speeds. Since the pinion gears 22, 24, 26 and 28 are rotationally rigid with their associated layshafts, the clutch gears 32, 34, 36 and 38 always simultaneously rotate at different speeds with the clutch gears providing the lower speed ratios rotating faster than the clutch gears providing the higher speed ratios. Thus, the clutch gear 32 always rotates faster than the clutch gear 34, the clutch gear 34 always rotates faster than the clutch gear 36, etc.

The shift member 14 is provided with one or more ratchets 50 on its left side as viewed in Figure 1 and one or more ratchets 52 on its right side. As illustrated, the ratchets 50 and 52 are mounted in pairs on a common bolt 54 with the noses or working ends of the ratchets 50 and 52 pointing in opposite directions, the nose of each ratchet 50 pointing in the direction of rotation of the shaft 10 and the nose of each ratchet 52 pointing against this direction of rotation. Springs 56 are provided for outwardly urging the working ends of the ratchets. In addition the working end of each ratchet is disposed in alinement with the remote side of one of the clutch teeth 48 on the shift member 14.

With the arrangement so far described, if the clutch teeth 48 of the shift member 14 are disposed between two adjacent gears—for example, 32 and 34—and with the shaft 10 rotating clockwise, as viewed in Figure 2, at a speed intermediate the gears 32 and 34, the clutch teeth 40 of the gear 32 will over-run the ratchet 50 and the clutch teeth of the gear 34 will under-run the ratchets 52. Now, if the speed of the shaft 10 should start to increase beyond the speed of the clutch gear 32, the ratchet 50 will immediately engage the clutch teeth 40 of the gear 32 and shift the shift member 14 to the left along its helical splines to bring its clutch teeth 48 into meshing engagement with the clutch teeth 40 of the gear 32. Because of the alinement of the working end of each ratchet 50 with the clutch teeth 48, when the ratchets 50 engage the clutch teeth 40, the clutch teeth 48 will be in alinement with the spaces between the clutch teeth 40 whereby these teeth engage without clashing. Similarly, if the speed of the shaft 10 should start to fall below that of the gear 34, the ratchets 52 will immediately engage the clutch teeth 40 of the gear 34 and shift the shift member 14 to the right along its helical splines into engagement with the gear 34. Here again, because of the alinement of the ratchets 52 with the teeth 48, the teeth 40 and 48 engage without clashing. The structure so far described is quite similar to that disclosed in the aforementioned application of R. Chilton.

In order to releasably lock the shift member 14 in engagement with any one of the clutch gears 32, 34, 36 and 38, the shift member is provided with axial splines 58 on its back. An annular unitary locking member 60 is disposed with its axial splines 62 in sliding engagement with said splines 58. In addition, the locking member 60 has axial splines 64 arranged for selective engagement with axially spaced sets of splines 66 on the shaft 10. With this construction, when the locking member 60 is in engagement with one of the sets of splines 66 on the shaft 10, the shift member is held against movement along its helical splines and, when the locking member moves out from engagement with one of the sets of shaft splines 66, the shift member 14 is freed for movement along its helical splines. Thus the locking member 60, with its spaced sets of axial splines 66, can lock the shift member 14 against movement along its helical splines 12 at spaced stations along the shaft 10 corresponding to the spacing of the gears 32, 34, 36 and 38.

The sets of splines 66 are staggered as seen in Figure 3. Thus, as illustrated, each set of splines 66 is rotationally displaced relative to an adjacent set of splines so that the individual splines of each set are disposed in alinement with the spaces between the individual splines of the adjacent sets. With this construction, the locking member 60 can not shift axially directly from one set of splines 66 into engagement with an adjacent set but, instead, must first shift axially to bring its splines 64 into the space between said one and adjacent sets of splines 66, then rotate into alinement with said adjacent splines 66 and then shift axially into engagement therewith. This path of the locking member splines 64 is illustrated by the dashed lines 68 in Figure 3. The angular offset of adjacent sets of splines 66 is made equal to the angular rotation of the shift member 14 in moving from engagement with one set of clutch teeth 40 to an adjacent set in order that the single unitary locking member 60 can lock the shift member 14 in engagement with any of the gears 32, 34, 36 or 38. As illustrated, the axial spacing of the splines 66 is equal to the axial spacing of the clutch teeth 40. This axial spacing obviously is not essential to the aforedescribed angular offset of adjacent splines 66 but is desirable since as a result the splines 58 and 62 always occupy the same relative position in each gear ratio thereby reducing the necessary length of the splines 58.

The locking member 60 is connected to a speed ratio control rod 70 through a two-way resilient connection. To this end, the rod 70 is provided with a pair of spaced flanges 72 and 74 against which a pair of slidable washers 76 and 78 are respectively urged by an interposed spring 80. A housing 82 surrounding the washers 76 and 78 is provided with inturned flanges 84 and 86 having a spacing equal to that of the flanges 72 and 74 and respectively engageable by the washers 76 and 78. The locking member 60 is provided with an annular groove 88 and an arm 90 rigid with the housing 82 extends into this annular groove. The control rod 70 is provided with a plurality of spaced notches 92 having a spacing corresponding to the spacing of the splines 66. A spring-pressed detent 94 is adapted to selectively engage any one of the notches 92 in the shift control rod. The spacing of the notches 92 defines the extent to which the control rod 70 must be shifted in going from one gear ratio to another and the particular notch 92 engaged by the spring-pressed detent 94 determines the speed ratio position of the control rod 70. As illustrated, the control rod is in its first speed ratio position and may be shifted to the right to its second, third and fourth speed ratio positions.

In Figure 1, the transmission is in first or low speed ratio and the drive connection from the shaft 10 to the output shaft 46 includes a set of splines 66, the locking member 60, the shift member 14, clutch teeth 48 and 40 and gears 32, 22, 42 and 44. When a shift to second speed is desired, the operator moves the control rod 70 to the right until the detent 94 engages the second notch 92 thereby compressing the spring 80. The spring 80, through the washer 78 and flange 86, urges the housing 82 and locking member 60 to the right to follow up the movement of the control rod 70, but the torque on the locking member splines prevents the locking member from following this shift movement. The operator then reduces the engine torque—for example, by closing the engine throttle or opening or short circuiting the ignition circuit—whereupon the spring 80 shifts the locking member to the right until its splines 64 abut against the adjacent set of shaft splines 66. This shift movement of the locking member is approximately equal to one-half the shift movement of the control rod so that the spring 80 still urges the locking member to the right. The shift member 14 is now free to move along its helical splines and, as the speed of the shaft 10 decreases, the shift member moves into the space between adjacent clutch gears 32 and 34. The operator keeps the engine power down until the speed of the shaft 10 starts to drop below the speed of the second speed clutch gear 34 whereupon the ratchets 52 immediately shift the shift member into engagement with this clutch gear. As soon as this takes place, the locking member splines 64 become alined with the spaces between the next set of shaft splines 66, whereupon the spring 80 completes the shift movement of the locking member into engagement with its second set of splines, thereby preventing further shift movement of the shift member 14 in either direction along its helical splines. With this movement of the locking member 60, the relative positions of the spring 80, locking member 60 and housing 82 are restored to that illustrated in Figure 1. The operator now restores the engine power and the transmission operates in second speed. To shift from second speed into third speed, the operator moves the control rod 70 to the right until the detent 94 engages the next notch 92 and the engine power is controlled, as in the previously described upshift, to complete the shift into third speed. In third speed, the shift member 14 is engaged with the clutch gear 36 and the locking member splines 64 are engaged with the third set of shaft splines 66 as counted from the left in Figure 1.

Assuming that the transmission is in third speed and that the operator wants to shift down to second speed, the control rod 70 is shifted to the left until the detent 94 engages the next notch 92 thereby compressing the spring 80. The operator then decreases the engine power, as in the case of an up-shift, and when the driving torque on the locking member splines decreases sufficiently, the spring 80 shifts the housing 82 and locking member 60 axially to the left until its splines 64 abut against the second set of splines 66 as counted from the left in Figure 1. The operator then restores the engine power to speed up the shaft 10 whereupon the shift member 14 moves to the left along its helical splines and, when the speed of the shaft 10 starts to exceed that of the second speed clutch gear 34, the ratchet 50 shifts the shift member 14 along its helical splines into engagement therewith. This movement of the shift member rotatively alines the locking member spline 54 with said second set of shaft splines 66 whereupon the spring 80 axially shifts the locking member into engagement therewith to complete the shift follow-up movement of the locking member. The shift member 14 is now locked into engagement with the second speed gear 34 against shift movement in both directions along its helical splines.

Summarizing, a speed ratio shift is effected by moving the control rod 70 from one speed ratio position to the next and then decreasing the power of the engine. When the torque on the locking member 60 reduces sufficiently, the spring 80 shifts the locking member out from its previously engaged set of splines 66, whereupon the shift member 14 is free to move along its helical splines. In the case of a down-shift, the engine power is now restored to accelerate the driving shaft 10 to the speed of the faster moving, but lower speed ratio, clutch gear to be engaged, whereas in the case of an up-shift, the engine power is not restored until the shaft 10 slows down to the speed of the slower moving higher speed ratio clutch gear to be engaged. That is, after the locking member 60 frees the shift member 14, the shift member ratchets move the shift member along its helical splines into engagement with the selected gear when, in the case of a down-shift, the speed of the shaft 10 starts to exceed that of the selected gear and, in the case of an up-shift, when the speed of the shaft 10 starts to fall below that of the selected gear.

The engine power may be automatically controlled—e. g., by manipulation of the engine throttle or ignition circuit—to the end that the opertaor need only move the control rod 70 to effect a shift. As illustrated in Figure 1, means are provided to automatically control the engine power in the manner described by controlling a ground on the engine ignition circuit. To this end, a wire 96 is connected into the engine ignition circuit and a pair of flexible contact arms 98 and 100 are connected to this wire and extend into the housing 82 through insulation 102. The housing 82 and washers 76 and 78 are continuously grounded as schematically indicated at 104. In the case of a down-shift, upon movement of the rod 70 to the left, the contact arm 100 engages the washer 78 as soon as the rod 70 has moved to its next lower speed ratio position thereby grounding the ignition circuit. That is, the contact arm 100 and the end of the washer 78 have a spacing slightly less than the spacing between the notches 92 on the control rod 70 when the parts are in the position illustrated in Figure 1. With this arrangement, as soon as the locking member splines 64 move out from engagement with the shaft splines 66, the ground is removed from the ignition circuit, thereby restoring the engine power.

The spacing between the contact arm 98 and the end of the washer 76 is less than one-half the spacing of the notches 92 on the control rod 70 when the parts are in the condition illustrated in Figure 1. Accordingly, upon an up-shift, the engine ignition circuit is grounded when the control rod 70 has been moved through approximately one-half its shift movement to the next higher gear ratio. However, the point at which the engine power is cut off, when a shift is initiated by a movement of the control rod 70, is not critical. Now, when the locking member splines 64 move out from engagement with the shaft splines 66, the washer 76 and contact arm 98 remain in engagement and it is not until after the shift member 14 has moved into engagement with a selected clutch gear and the locking member has started to move into engagement with the corresponding splines 66 that the washer 76 and contact arm 98 separate to remove the ignition ground, whereupon the engine power is restored. Therefore, with the contact arms 98 and 100 arranged as described, the operator need only move the control rod 70 from one speed ratio position to the next, the remainder of the operation being entirely automatic.

With the structure of Figures 1 to 3, after the locking member splines 64 shift out from engagement with one of the sets of splines 66, the shift member 14 is free to move in either direction along its helical splines. Accordingly, it is necessary that the control of the engine power be properly coordinated with the movements of the locking member in order to effect a desired shift. Suppose, for example, a down-shift has been initiated by movement of the control rod 70 to the left, but the engine power is not properly restored at the time the locking member splines 64 shift out from engagement with one of the sets of splines 66, then, the output shaft 46 might over-run the input shaft and cause the shift member to shift in an up-shift direction to the next higher clutch gear, thereby rotatively alining the locking member splines 64 with the adjacent set of splines 66 whereupon the spring 80 would complete the shift movement of the locking member 60. The transmission would then be in the next higher gear ratio although a down-shift had been intended. To positively prevent a wrong shift as a result of an improper coordination of the engine power with movements of the locking member 60, the spline sets 66 can be formed so that each spline 64 on the locking member has only one possible path of movement relative to the sets of splines 66. Such a construction is illustrated in Figure 4.

In Figure 4, the spline sets 110 and splines 112 respectively correspond to the spline sets 66 and the locking member spline 64 of Figure 3. In Figure 4, adjacent spline sets 110 are rotatively displaced approximately one-fourth (instead of one-half as in Figure 3) of the angular spacing of the individual splines of each set. In addition, each of the splines 110 is provided with a projection 114 extending axially into the space between each set of these splines. The modification of Figure 4 is otherwise identical with the structure of Figures 1 to 3. With this construction, the locking member splines 112 can only move relative to the spline sets 110 along the path indicated by the dashed lines 116 of Figure 4, and, therefore, the shift member 14 can only rotate in the desired direction when freed by the locking member. Accordingly, with the construction of Figure 4, when the locking member splines 112 have been initially moved in an up-shift direction into the space between adjacent sets of splines 110, the shift can be completed only by an up-shift movement of the member 14 and vice versa.

Obviously, the positions of the splines 64 and 66 could be reversed—that is, the splines 64 may be formed on the shaft 10 for selective engagement by a plurality of sets of splines 66 formed internally on the locking member 60. It is also within the scope of this invention to place the spaced spline sets on the shift member instead of on the input shaft. Such a construction is illustrated in Figure 5. In this modification, an input shaft 120 is provided with axial splines 122 and helical splines 124 and a shift member 126 is slidable along the helical splines 124 and is selectively engageable with clutch gears 128, 130, 132 and 134 as in Figure 1. Also, as in Figure 1, the shift member has ratchets adapted to cooperate with the clutch gears for moving the shift member along its helical splines. The shift member is provided with spline sets 136 having a spacing equal to a spacing of the clutch gears. A locking member 138 is provided with splines 140 engageable with the axial shaft splines 122 and with the spline sets 136. The relation between the sets of splines 136 and the locking member splines 142 essentially is the same as that illustrated in Figure 3 or Figure 4.

A speed ratio control rod 144 is connected with the locking member 138 through a two-way resilient connection including a spring 146. As illustrated, this connection is similar to the resilient connection between the control rod 70 and the locking member 60 in Figure 1. The control rod 144 has a notch 146 engageable by a spring-pressed detent 148 to define an intermediate position of the control rod. The control rod is movable in each direction from the intermediate position until its head 150 engages stop shoulders 152 or 154. It is essential that the range of movement of the control rod from its intermediate position be greater than the necessary movement of the locking member 138 so that its splines 142 move into the space between adjacent sets of splines 136 to free the shift member from movement along its helical splines.

The clutch gears 128, 130, 132 and 134 respectively correspond to the clutch gears 32, 34, 36 and 38 of Figure 1 and therefore, as illustrated in Figure 5, the transmission is in low or first speed ratio. To shift into second speed, the control rod 144 is moved to the left (as compared to the right in Figure 1) against the stop 152. The engine power is then reduced to remove the torque on the locking member 138 whereupon the locking member shifts to the left to bring its splines between the first and second sets of splines 136 as counted from the right. The engine power is then restored and the shift rod 144 is released whereupon the shift member 126 moves to the right into engagement with the clutch gear 130. At the same time, because the locking member splines 142 are not in alinement with said second set of splines 136, the shift member 126 pulls the locking member to the right. As the locking member moves to the right, it pulls the shift control rod 144 with it until the detent 148 engages the notch 146 to prevent further movement of the rod 144 by the locking member 138. Further movement of the locking member by the shift member compresses the spring 145 and when the shift member 126 moves into engagement with the second speed gear 130, the locking member splines 142 are then in alinement with said second set of splines 136 whereupon the spring 145 shifts the locking member to the left into engagement with said splines 136 to complete the shift.

To effect a down-shift, the control rod 144 is moved to the right against the stop 154. As in Figures 1 to 3, the remainder of a down-shift is similar to an up-shift except the shift and locking members now move in directions opposite to their corresponding movement in the case of an up-shift and the engine power is not restored until the shift member engages the next lower speed ratio gear.

Instead of effecting shift movements by controlling the engine power, it is within the scope of this invention to provide a hydraulic coupling or friction clutch between the input and output shafts in parallel with the clutch gears and shift member and then controlling this coupling or clutch to effect the shift movements as fully disclosed in the aforementioned application of Roland Chilton.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In a multi-speed transmission, a drive transmitting member having helical splines, a speed ratio shift member movable along said helical splines, at least three axially spaced gears selectively engageable by said shift member for providing said transmission with a corresponding number of speed ratios, and a unitary locking member adapted to lock said shift member against movement in both directions along said helical splines while said shift member is in engagement with any one of said gears.

2. In a multi-speed transmission, a drive transmitting member having helical splines, a speed ratio shift member movable along said helical splines, at least three axially spaced gears selectively engageable by said shift member for providing said transmission with a corresponding number of speed ratios, and a unitary locking member engageable with said drive transmitting and shift members to lock said shift member against movement in both directions along said helical splines while said shift member is in engagement with any one of said gears.

3. In a multi-speed transmission, a drive transmitting member having helical splines and axial splines, a speed ratio shift member movable along said helical splines and having axial splines, at least three axially spaced gears selectively engageable by said shift member for providing said transmission with a corresponding number of speed ratios, and a locking member having axial splines engageable with the axial splines on said drive and shift members, the axial splines on one of said members comprising a plurality of axially spaced sets of splines equal in number to the number of said gears and being selectively engageable by the cooperating axial splines to lock said shift member in engagement with any one of said gears.

4. In a multi-speed transmission, a drive transmitting member having helical splines, a speed ratio shift member movable along said helical splines, at least three axially spaced gears selectively engageable by said shift member for providing said transmission with a corresponding number of speed ratios, and means for locking said shift member in engagement with any one of said gears, said means comprising a locking member having axial splines arranged to engage axial splines on said shift member and axial splines on said drive transmitting member, the axial splines on one of said members comprising a plurality of axially spaced sets of splines equal in number to the number of said gears with each set of splines being rotatively displaced out of alinement relative to adjacent sets by an angle equal to the angle of rotation of the shift member in moving from one of said gears to an adjacent gear.

5. In a multi-speed transmission, a drive transmitting member having helical splines, a speed ratio shift member movable along said helical splines, at least three axially spaced gears selectively engageable by said shift member for providing said transmission with a corresponding number of speed ratios, and means for locking said shift member in engagement with any one of said gears, said means comprising a locking member having axial splines arranged to engage axial splines on said shift member and axial splines on said drive transmitting member, the splines on one of said members comprising a plurality of axially spaced sets of splines equal in number to the number of said gears with the space between said spline sets being greater than the length of the splines engageable therewith and with each set of splines being rotatively displaced out of alinement relative to adjacent sets by an angle equal to the angle of rotation of the shift member in moving from one of said gears to an adjacent gear.

6. In a multi-speed transmission, a drive transmitting member having helical splines, a speed ratio shift member movable along said helical splines, a plurality of axially spaced gears selectively engageable by said shift member for providing said transmission with a plurality of speed ratios, and means for locking said shift member in engagement with any one of said gears, said means comprising a locking member having axial splines arranged to engage axial splines on said shift member and axial splines on said drive transmitting member, the axial splines on one of said members comprising a plurality of selectively engageable axially spaced sets of splines having space between adjacent sets sufficient to permit relative rotative movement of the axial splines selectively engageable therewith, each of said sets of splines being rotatively displaced out of alinement relative to adjacent sets by an angle equal to the angle of rotation of the shift member in moving from one of said gears to an adjacent gear, and axial projections on splines of each of said sets to confine the splines selectively engageable therewith to only one path of movement relative thereto.

7. In a multi-speed transmission, a drive transmitting member having helical splines, a speed ratio shift member movable along said helical splines, a plurality of axially spaced gears selectively engageable by said shift member for providing said transmission with a plurality of speed ratios, and means for locking said shift member in engagement with any one of said gears, said means comprising a locking member having axial splines arranged to engage axial splines on said shift member and axial splines on said drive transmitting member, the axial splines on one of said members comprising a plurality of selectively engageable axially spaced sets of splines having space between adjacent sets sufficient to permit relative rotative movement of the axial splines selectively engageable therewith, each of said set of splines being rotatively displaced out of alinement relative to adjacent sets by an angle equal to the angle of rotation of the shift member in moving from one of said gears to an adjacent gear, the splines of each set and the splines engageable therewith being so formed that there is but one path of relative movement therebetween.

8. In a multi-speed transmission, a drive transmitting member having helical splines and a plurality of axially spaced sets of axial splines, a speed ratio shift member movable along said helical splines and having axial splines, a plurality of axially spaced gears selectively engageable by said shift member for providing said transmission with a plurality of speed ratios, and a locking member engageable with the axial splines on said shift member and selectively engageable with said sets of splines for locking said shift member in engagement with any one of said gears, each of said sets of splines being rotatively displaced out of alinement relative to adjacent sets by an angle equal to the angle of rotation of said shift member in moving from one of said gears to an adjacent gear.

9. In a multi-speed transmission; a drive transmitting member having helical splines and axial splines; a speed ratio shift member movable along said helical splines and having axial splines; at least three axially spaced sets of gears selectively engageable by said shift member for providing said transmission with a corresponding number of speed ratios; and means for locking said shift member in engagement with any one of said gears, said means comprising a locking member having axial splines engageable with the axial splines on said drive and shift members, the engageable axial splines on said locking member and on one of the other members comprising a single set of splines on one of said latter two members selectively engageable with a plurality of axially spaced sets of splines on the other of said latter two members, said plurality of axially spaced sets of splines being equal in number to the number of said gears.

10. In a multi-speed transmission; a drive transmitting member having helical splines and at least three axially spaced sets of axial splines; a speed ratio shift member movable along said helical splines and having axial splines; at least three axially spaced gears equal in number to the number of said axially spaced sets of splines, said gears being selectively engageable by said shift member for providing said transmission with a corresponding number of speed ratios; and a locking member having a set of axial splines engageable with the axial splines on said shift member and having another set of axial splines selectively engageable with said axially spaced sets of splines for locking said shift member in engagement with any one of said gears, each of said sets of axially spaced sets of splines being rotatively displaced out of alinement with adjacent sets by an angle equal to the angle of rotation of said shift member in moving from one of said gears to an adjacent gear.

11. In a multi-speed transmission; a drive transmitting member having helical splines and axial splines; a speed ratio shift member movable along said helical splines and having axial splines; at least three axially spaced gears selectively engageable by said shift member for providing said transmission with a corresponding number of speed ratios; and means for locking said shift member in engagement with any one of said gears, said means comprising a locking member having axial splines engageable with the axial splines on said drive and shift members, the engageable axial splines on said locking member and on one of the other members comprising a single set of splines on one of said latter two members selectively engageable with a plurality of axially spaced sets of splines on the other of said latter two members whereby movement of said locking member to disengage said single set of splines frees said shift member for movement along its helical splines, said plurality of axially spaced sets of splines being equal in number to the number of said gears and the splines of each said set being rotatively displaced out of alinement with the splines of the adjacent sets by an angle equal to the angle of rotation of the shift member in moving from one of said gears to the adjacent gear.

12. In a multi-speed transmission as recited in claim 11 in which the splines of said single set have an axial length which is less than the axial space between adjacent sets of said plurality of axially spaced sets of splines.

13. In a multi-speed transmission as recited in claim 11 and including means for automatically moving said shift member out from engagement with any one of said gears when the driving torque therebetween becomes substantially zero and for automatically moving said shift member into engagement with an adjacent gear upon speed synchronims therewith; and means for automatically controlling said torque relief and speed synchronisms in response to movement of said locking member for freeing said shift member such that the direction of the movement of said shift member along its helical splines depends on the direction of movement of said locking member.

VICTOR D. BEHN.

REFERENCES CITED

The following references are of record in the file of this patent:

UNITED STATES PATENTS

| Number | Name | Date |
|---|---|---|
| 2,045,835 | Coen | June 30, 1936 |
| 2,248,133 | Snow | July 8, 1941 |
| 2,400,539 | Chilton | May 21, 1946 |